(12) United States Patent
Bloomquist et al.

(10) Patent No.: US 8,681,921 B2
(45) Date of Patent: Mar. 25, 2014

(54) SYSTEM FOR ASSEMBLING OR DISASSEMBLING A SEGMENTED ROD

(75) Inventors: Bradley D. Bloomquist, Wilmington, NC (US); David Grey Smith, Leland, NC (US); David P. Ketcham, Charlotte, NC (US); William Earl Russell, II, Wilmington, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 989 days.

(21) Appl. No.: 12/414,055

(22) Filed: Mar. 30, 2009

(65) Prior Publication Data

US 2010/0246742 A1 Sep. 30, 2010

(51) Int. Cl.
*G21C 19/00* (2006.01)
*G21C 3/00* (2006.01)
*G21C 3/30* (2006.01)

(52) U.S. Cl.
USPC ........... 376/261; 376/429; 376/431; 376/264; 376/433; 376/426

(58) Field of Classification Search
USPC .................. 376/429, 431, 261, 264, 433, 426
See application file for complete search history.

(56) References Cited

U.S. PATENT DOCUMENTS

| | | | |
|---|---|---|---|
| 3,514,838 A | 6/1970 | Freeborg | |
| 3,864,956 A * | 2/1975 | Barry | 72/338 |
| 3,887,980 A | 6/1975 | Yates et al. | |
| RE30,065 E * | 8/1979 | Anthony et al. | 376/353 |
| 4,476,089 A * | 10/1984 | Muller-Frank et al. | 376/381 |
| 4,623,512 A * | 11/1986 | Desfontaines | 376/364 |
| 4,687,245 A | 8/1987 | Formanek | |
| 5,075,072 A * | 12/1991 | Vollman | 376/335 |
| 5,089,220 A * | 2/1992 | Nylund | 376/439 |
| 5,173,249 A | 12/1992 | Merkovsky | |
| 5,255,300 A * | 10/1993 | Patterson et al. | 376/423 |
| 5,377,238 A | 12/1994 | Gebelin et al. | |
| 5,491,733 A * | 2/1996 | Patterson et al. | 376/443 |
| 6,327,324 B2 * | 12/2001 | Nylund | 376/433 |
| 6,649,055 B1 * | 11/2003 | Whitton et al. | 210/258 |
| 7,526,058 B2 * | 4/2009 | Fawcett et al. | 376/426 |
| 2004/0109522 A1 * | 6/2004 | Smith | 376/261 |
| 2006/0039524 A1 * | 2/2006 | Feinroth et al. | 376/409 |
| 2007/0133734 A1 * | 6/2007 | Fawcett et al. | 376/438 |
| 2008/0205577 A1 * | 8/2008 | Ketcham et al. | 376/268 |
| 2009/0135988 A1 * | 5/2009 | Russell et al. | 376/438 |
| 2010/0030008 A1 * | 2/2010 | Russell et al. | 588/16 |

OTHER PUBLICATIONS

Swedish Office Action issued Dec. 23, 2010 (with unofficial English translation) in connection with corresponding Swedish Application No. 1050241-7.

* cited by examiner

*Primary Examiner* — Jack W Keith
*Assistant Examiner* — Frank J McGue
(74) *Attorney, Agent, or Firm* — Ryan Alley Intellectual Property Law

(57) ABSTRACT

An embodiment of the present invention takes the form of a system that allows for simultaneously assembling or disassembling multiple segmented nuclear fuel rods (hereinafter "segmented rods"). An embodiment of the present invention, may receive, secure, and move the segmented rods into a position that allows for performing the tasks of either assembly or disassembly, allowing for an operator to use a tool to complete the aforementioned tasks.

12 Claims, 8 Drawing Sheets

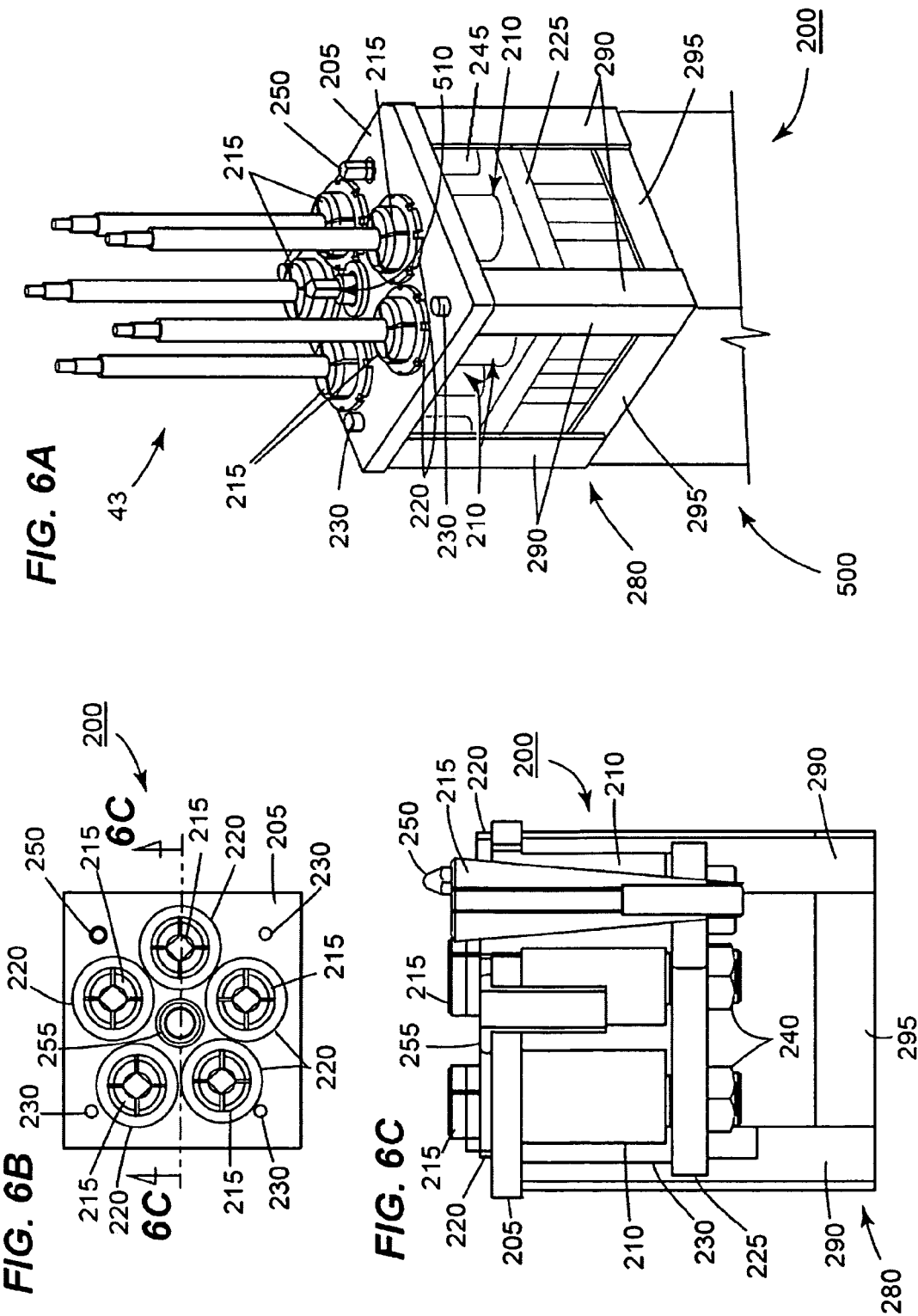

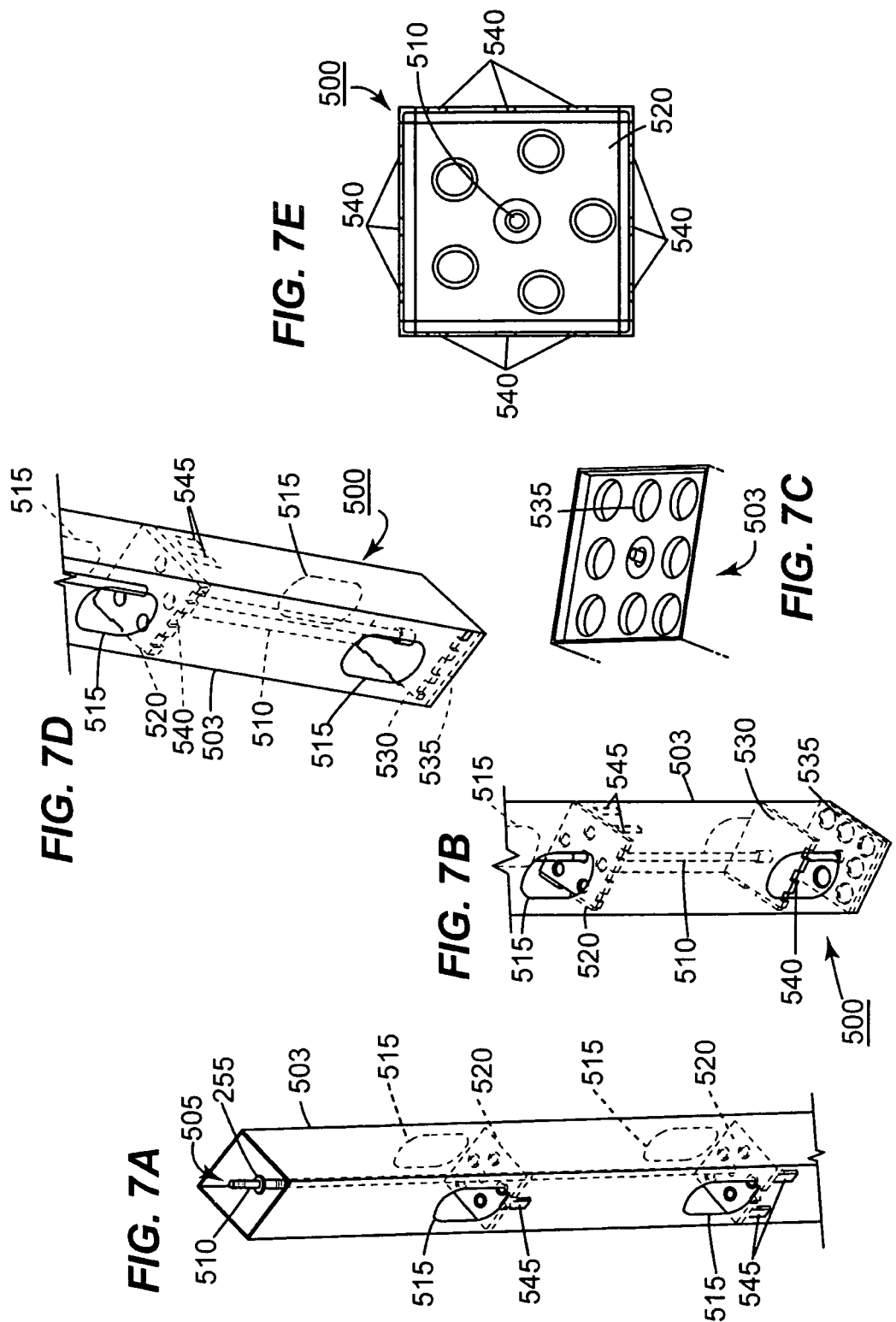

SYSTEM FOR ASSEMBLING OR DISASSEMBLING A SEGMENTED ROD

BACKGROUND OF THE INVENTION

The present application relates generally to nuclear fuel rods; and more particularly to, a system for assembling or disassembling a segmented rod of a nuclear fuel bundle used within a nuclear reactor pressure vessel.

FIG. 1 is a schematic illustrating an environment in which an embodiment of the present invention may operate. FIG. 1 illustrates a typical nuclear processing facility 10, which may comprise a spent fuel pool 12, and a reactor pressure vessel (RPV) 15.

FIG. 2 is a schematic illustrating the RPV 15 of FIG. 1. During operation of the reactor, cooling water circulating inside a RPV 15 is heated by nuclear fission produced in the nuclear fuel core 35. Feedwater is admitted into the RPV 15 via a feedwater inlet 17 and a feedwater sparger 20. The feedwater flows downwardly through a downcomer annulus 25, which is an annular region between RPV 15 and a core shroud 30.

The core shroud 30 is a stainless steel cylinder that surrounds the nuclear fuel core 35, which includes nuclear fuel bundle assemblies 40, only a few are illustrated in FIG. 2, having a plurality of segmented fuel rods 43. A top guide 45 and a core plate 50 support each fuel bundle assembly 40.

The cooling water flows downward through the downcomer annulus 25 and into the core lower plenum 55. Then, the water in the core lower plenum 55 flows upward through the nuclear fuel core 35. In particular, water enters the fuel bundle assemblies 40, wherein a boiling boundary layer is established. A mixture of water and steam exits the nuclear fuel core 35 and enters the core upper plenum 60 under the shroud head 65. The steam-water mixture then flows through steam separators 70 on top of the shroud head 65 and enters the steam dryers 75, which separate water from steam. The separated water is recirculated back to the downcomer annulus 25 and the steam flows out of the RPV 15 and to a steam turbine, or the like, which is not illustrated in the Figures.

The BWR also includes a coolant recirculation system, which provides the forced convection flow through the nuclear fuel core 35 necessary to attain the required power density. A portion of the water is drawn from the lower end of the downcomer annulus 25 via recirculation water outlet 80 and forced by a recirculation pump (not illustrated) into a plurality of jet pump assemblies 85 via recirculation water inlets 90. The jet pump assemblies 85 are typically circumferentially distributed around the core shroud 30 and provide the required reactor core flow. A typical BWR may have between sixteen to twenty-four inlet mixers 95.

As illustrated in FIG. 2, a conventional jet pump assembly 85 comprises a pair of inlet mixers 95. Each inlet mixer 95 has an elbow welded thereto, which receives pressurized driving water from a recirculation pump via an inlet riser 97. A type of inlet mixer 95 comprises a set of five nozzles circumferentially distributed at equal angles about an axis of the inlet mixer 95. Here, each nozzle is tapered radially inwardly at the nozzle outlet. This convergent nozzle energizes the jet pump assembly 85. A secondary inlet opening may be located radially outside of the nozzle exits. Therefore, as jets of water exit the nozzles, water from the downcomer annulus 25 is drawn into the inlet mixer 95 via the secondary inlet opening, where mixing with water from the recirculation pump then occurs.

During the shutdown of the nuclear reactor, some of the segmented rods 43 may be removed from a fuel bundle assembly 40. These segmented rods 43 are then disassembled for further processing. The disassembly process is time consuming, delaying the processing and preparation of the segmented rods 43 before reentry into the RPV 15.

For the aforementioned reasons, there is a need for a system for disassembling a plurality of segmented rods 43 of a nuclear reactor core. The system should allow for simultaneously disassembling multiple segmented rods 43. The system should reduce the disassembly time and lower operator exposure to radioactivity.

BRIEF DESCRIPTION OF THE INVENTION

In accordance with an embodiment of the present invention, a system for positioning at least one segmented rod, the system comprises: a channel assembly for receiving a plurality of segmented rods, wherein the channel assembly encloses the plurality of segmented rods and comprises a channel and a lifting mechanism, wherein the lifting mechanism positions the plurality of segmented rods to allow for the assembly or disassembly of each of the plurality of segmented rods. Here, the system of claim may further comprise a holder assembly located at a top end of the channel assembly, wherein the holder assembly comprises: a separate holder for each segmented rod, wherein the holder secures the segmented rod in a position allowing for assembly or disassembly; a mechanism for opening and closing each holder; wherein the mechanism opens and closes all holders in unison; and an opening that allows for integrating the lifting mechanism with the holder assembly, wherein the lifting mechanism may lift the plurality of segmented rods in unison.

In accordance with another embodiment of the present invention, a system for positioning segmented rods of a nuclear reactor, the system comprises: a nuclear processing facility comprising: a spent fuel pool, a reactor pressure vessel (RPV); wherein the RPV comprises a fuel bundle comprising segmented rods; and a segmented rod positioning chamber comprising, wherein the segmented rod positioning chamber comprises: a channel assembly for receiving the segmented rods, wherein the channel assembly encloses segmented rods and comprises a channel and a lifting mechanism, wherein the lifting mechanism moves the segmented rods within the channel; and wherein the lifting mechanism allows for the assembly or disassembly of the plurality of segmented rods. Here, the system may further comprise a collet assembly located at a forward end of the channel assembly, wherein the collet assembly comprises: a plurality of collets, wherein an individual tapered collet is designated for each segmented rod, wherein each collet secures a single segmented rod in a position allowing for assembly or disassembly of each of the plurality of segmented rods; and a mechanism for opening and closing each collet.

BRIEF DESCRIPTION OF THE DRAWING

FIGS. 4A-4C, collectively

FIGS. 6A-6C, collectively FIG. 6, are schematics illustrating isometric, top, and front views of a holder assembly of FIG. 5, in accordance with an embodiment of the present invention.

FIGS. 7A-7E, collectively FIG. 7, are schematics illustrating elevation, top, and bottom views of a channel assembly of the segmented rod positioning chamber, in accordance with an embodiment of the present invention.

FIG. 8, are schematics, illustrating isometric views of the segmented rod positioning chamber in use, in accordance with an embodiment of the present invention.

DETAILED DESCRIPTION OF THE INVENTION

Certain terminology is used herein for convenience only and is not to be taken as a limitation on the invention. For example, words such as "upper", "lower", "left", "front", "right", "horizontal", "vertical", "upstream", "downstream", "fore", "aft", "top", "bottom" merely describe the configuration shown in the Figures. Indeed, the components may be oriented in any direction and the terminology, therefore, should be understood as encompassing such variations unless specified otherwise.

An embodiment of the present invention takes the form of a system that allows for simultaneously assembling or disassembling multiple segmented nuclear fuel rods (hereinafter "segmented rods"). An embodiment of the present invention, may receive, secure, and move the segmented rods 43 into a position that allows for performing the tasks of either assembly or disassembly; allowing for an operator to use a tool to complete the aforementioned tasks. An embodiment of the present invention may be used with a wide variety of segmented rods 43 used within an RPV 15.

Figure 3:
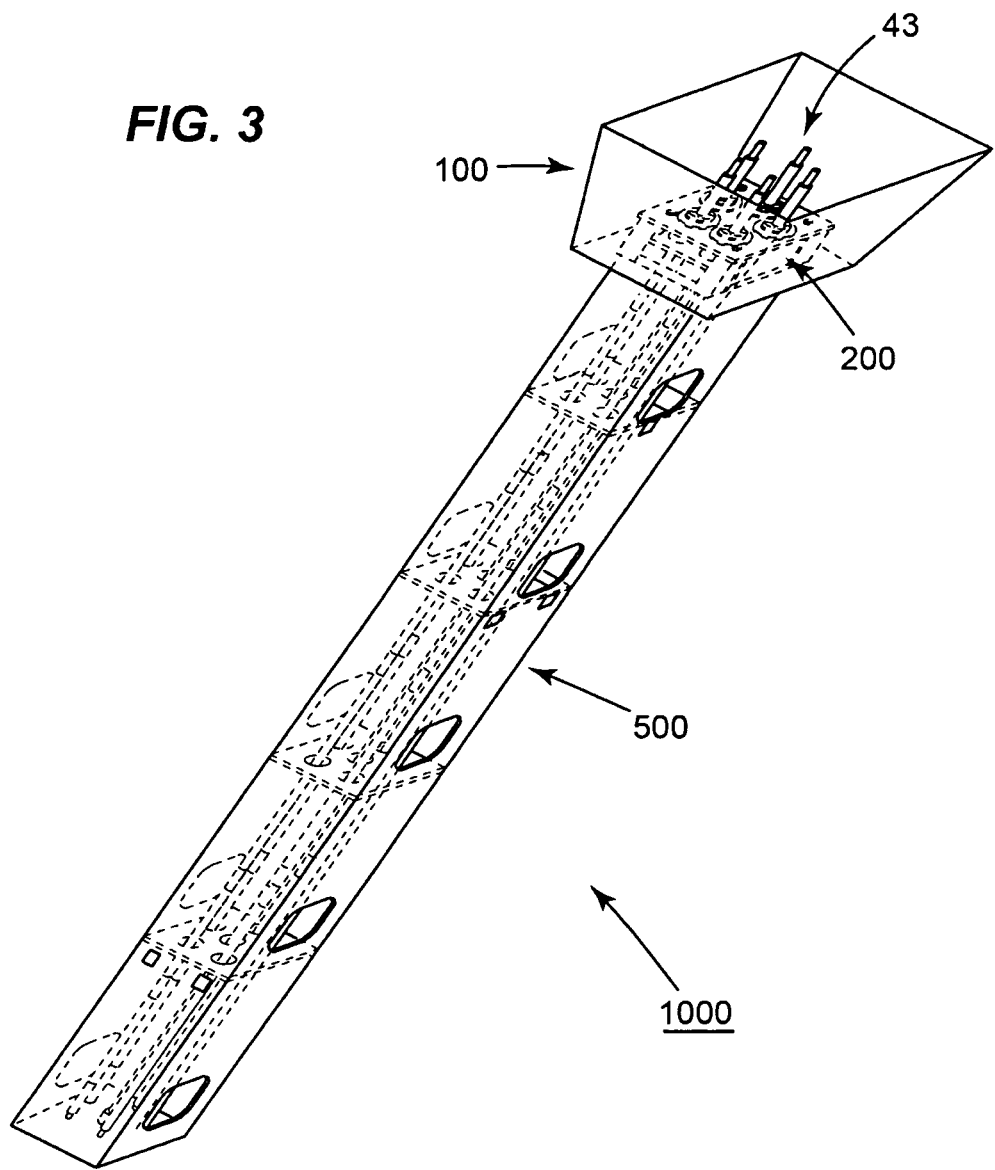
FIG. 3 is a schematic illustrating an isometric view of a segmented rod positioning chamber, in accordance with an embodiment of the present invention.

Referring again to the Figures, where the various numbers represent like parts throughout the several views. FIG. 3 is a schematic illustrating an isometric view of a segmented rod positioning chamber 1000, in accordance with an embodiment of the present invention. FIG. 3 provides an overview of an embodiment of the present invention. The segmented rod positioning chamber 1000 may comprise a channel assembly 500 having a length approximately equal to that of a fully assembled segmented rod 43. A holder assembly 200, for controlling the movement of the plurality of segmented rods 43 within the channel assembly 500, may be connected to an upper end of the segmented rod positioning chamber 1000. A basin 100 for catching loose rod segments or rod components may surround the holder assembly 200.

Figure 1:
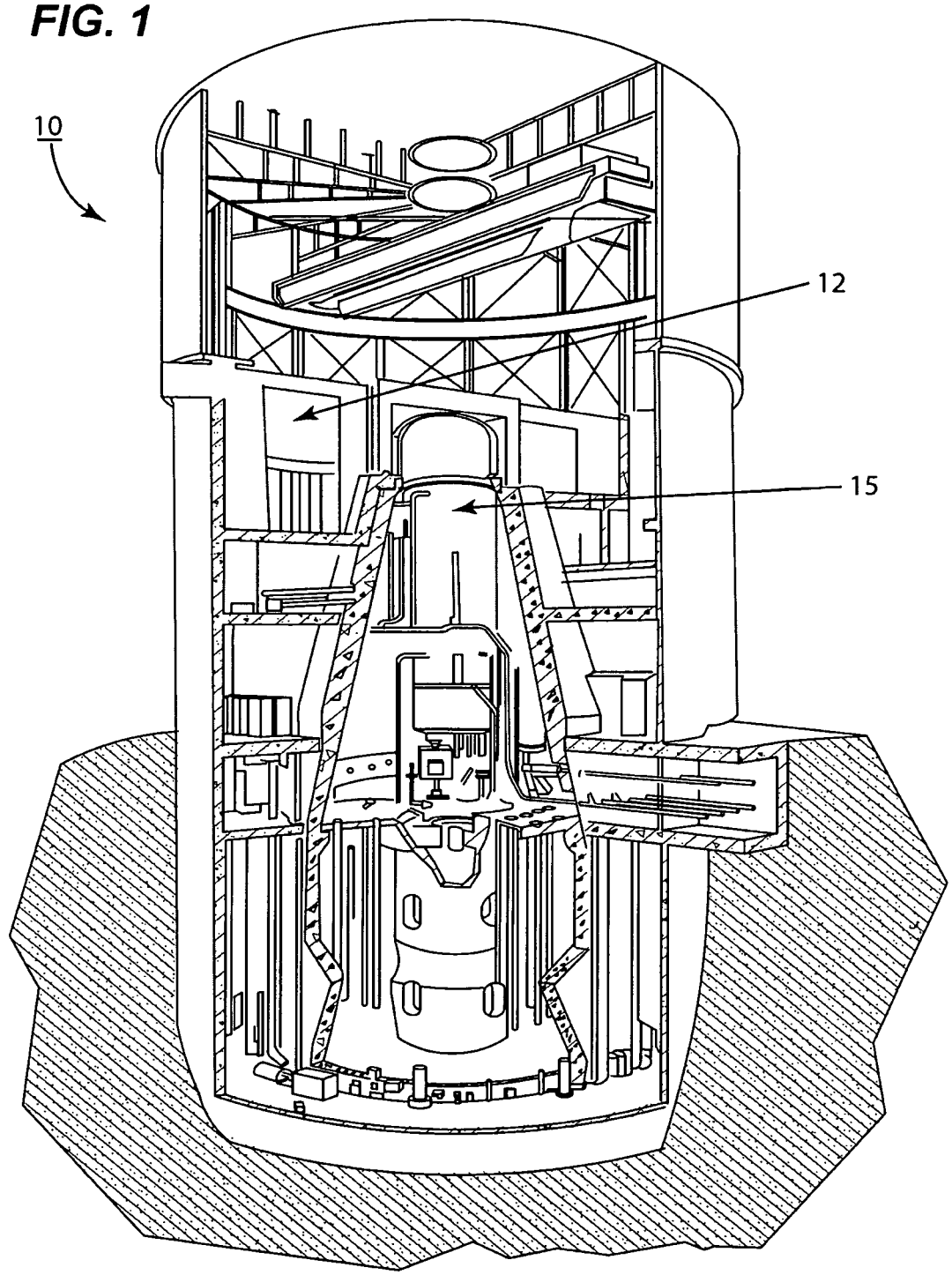
FIG. 1 is a schematic illustrating the environment in which an embodiment of the present invention operates.
Figure 2:
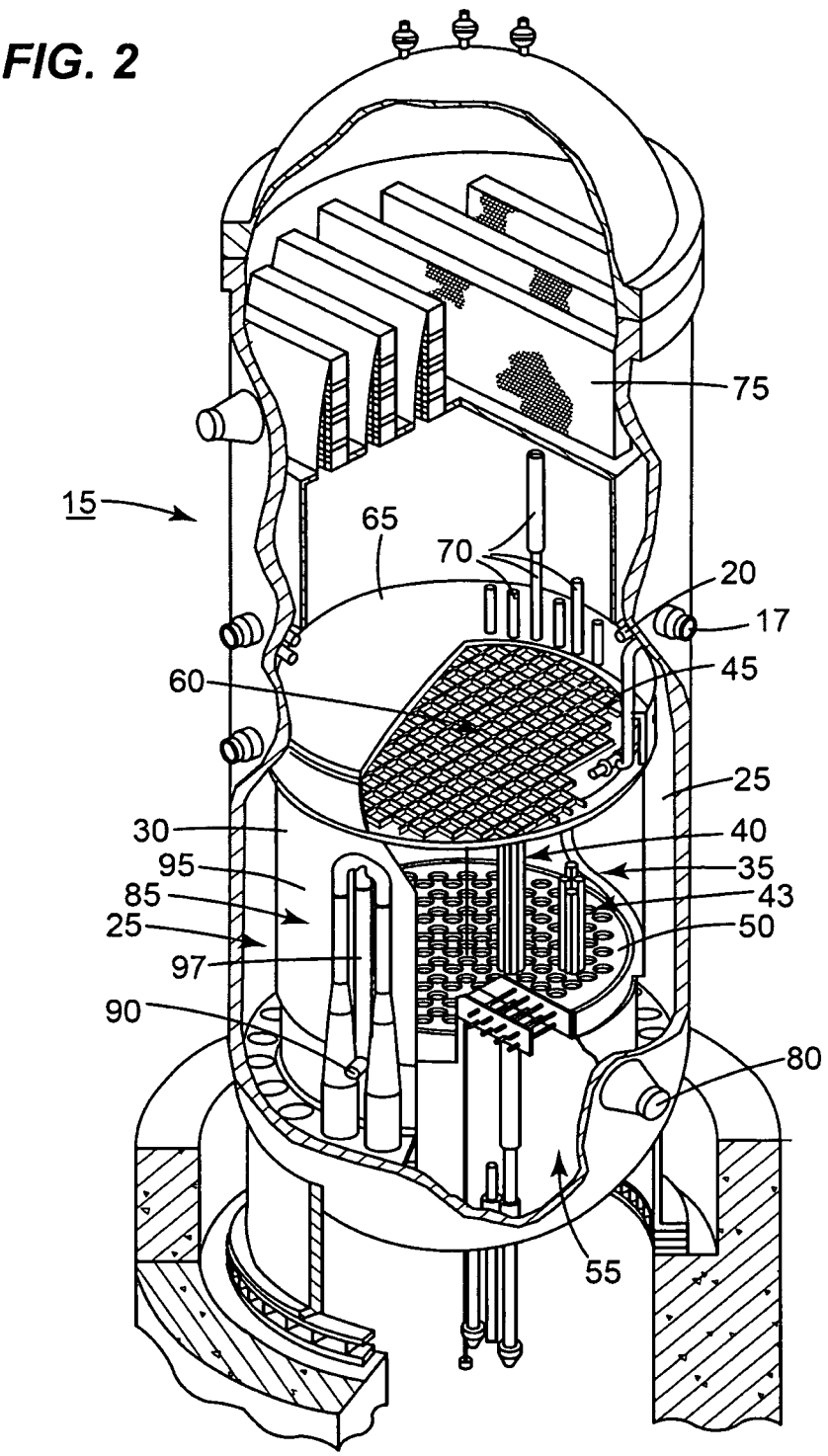
FIG. 2 is a schematic illustrating the RPV of FIG. 1.
Figure 4:
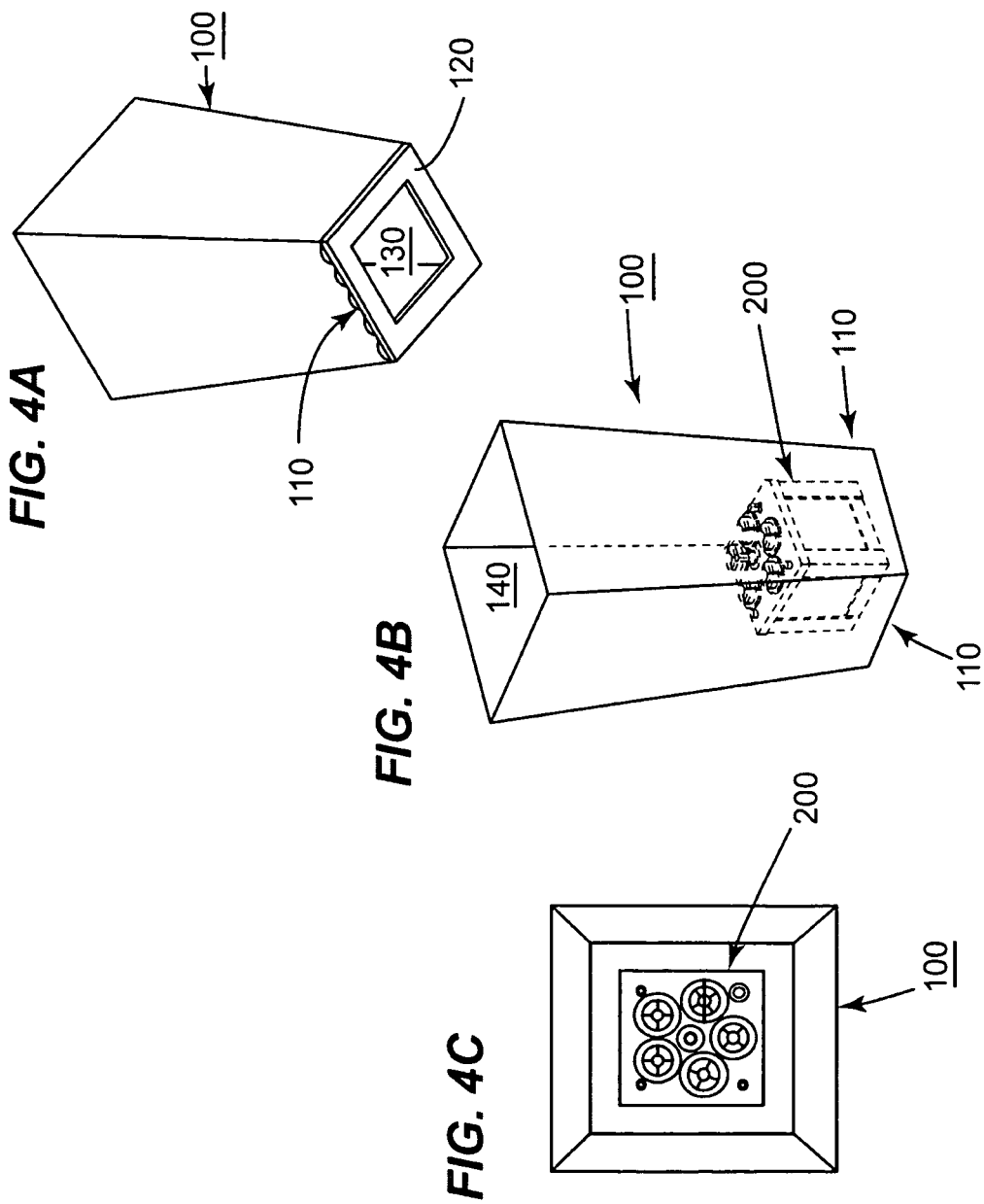
FIG. 4, are schematics illustrating isometric, front, and top views of a catch basin of a segmented rod positioning chamber, in accordance with an embodiment of the present invention.

FIGS. 4A-4C, collectively FIG. 4, are schematics illustrating isometric, front, and top views of a basin 100 of a segmented rod positioning chamber 1000, in accordance with an embodiment of the present invention. The basin 100 may help to ensure that segments of a segmented rod 43 do not fall from the segmented rod positioning chamber 1000. An operator of the segmented rod positioning chamber 1000 may be positioned above a spent fuel pool 12 (illustrated in FIG. 1) of a nuclear power plant. Here, the basin 100 may reduce the chance of a segment falling into the spent fuel pool 12.

FIG. 4A illustrates a perspective view of an embodiment of the basin 100, which may comprise drainage holes 110 and a mounting surface 120. The drainage holes 110 may allow for the fluid of the spent fuel pool 12 to flow through the basin 100; and lighten the overall weight of the segmented rod positioning chamber 1000. The drainage holes 110 may be located at an aft end of the basin 100. The mounting surface 120 may provide a bearing surface when connecting the basin 100 with the top end of a segmented rod positioning chamber 1000.

The basin 100 may have a bottom opening 130 that allows for the basin 100 to surround the holder assembly 200. The basin 100 may have a top opening 140 that allows an operator to access the holder assembly 200. The basin 100 may be formed of any shape that may surround the holder assembly 200, as illustrated in FIG. 4B. In an embodiment of the present invention, the top opening 140 may be larger than the bottom opening 130, allowing an operator greater access to the holder assembly 200 and the surrounding area, as illustrated in FIG. 4.

Figure 5:
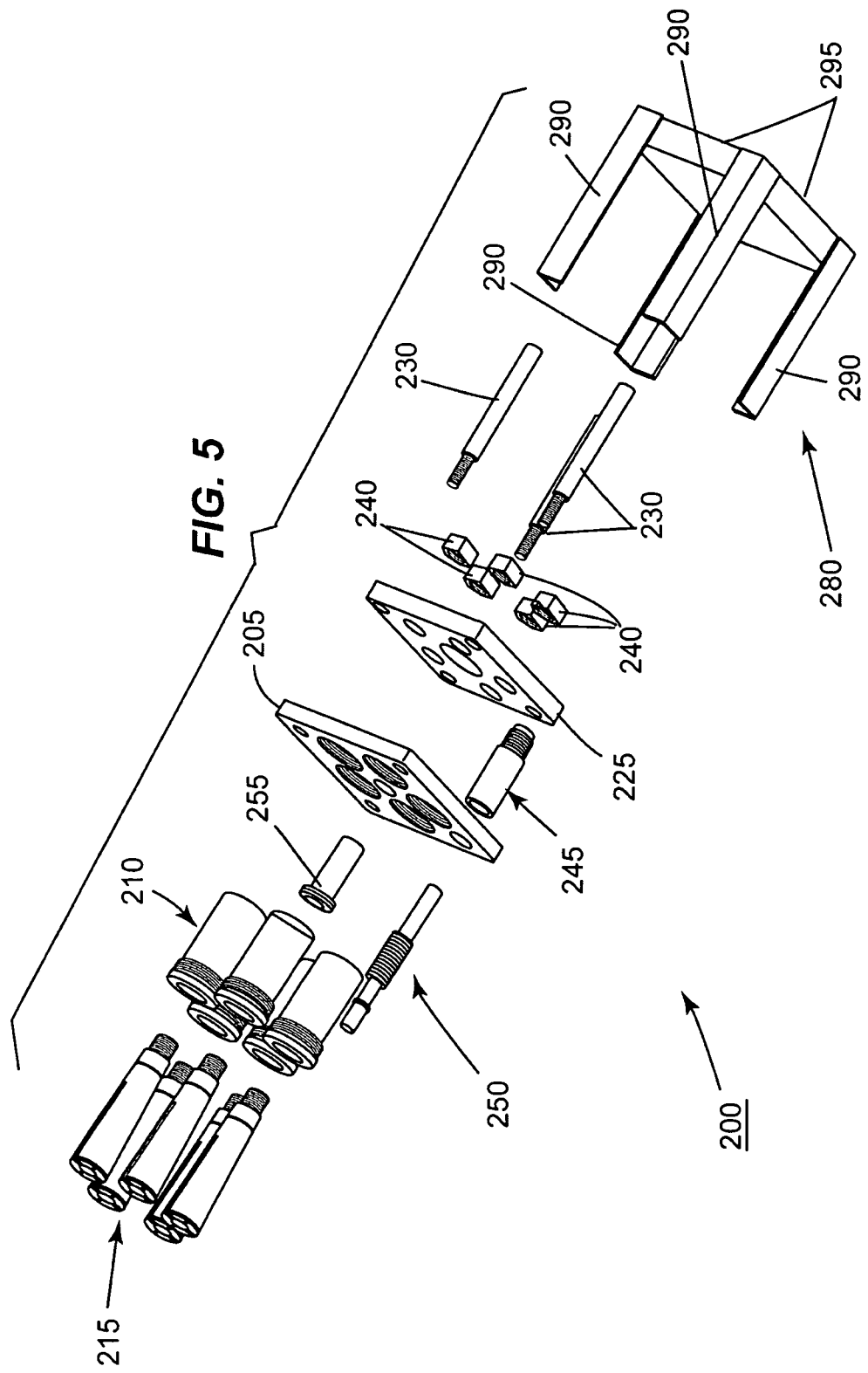
FIG. 5 is a schematic illustrating an exploded view of a holder assembly of a segmented rod positioning chamber, in accordance with an embodiment of the present invention.

FIG. 5 is a schematic illustrating an exploded view of the holder assembly 200 of a segmented rod positioning chamber 1000, in accordance with an embodiment of the present invention. The holder assembly 200 generally serves to control the movement of the segmented rods 43 within the channel assembly 500. The holder assembly 200 may move and secure each segmented rod 43 in a position that allows an operator to remove the exposed segment. Next, the holder assembly 200 may secure the segmented rods 43 in a position that allows for the removal of the next exposed segment. Alternatively, the holder assembly 200 may secure the segmented rods 43 in a position that allows for connecting the next segment. The process may be repeated until all segments of the plurality of segmented rods 43 have been removed or assembled, respectively.

In an embodiment of the present invention, the support plate 205 forms a top surface of the holder assembly 200. The holder assembly 200 may comprise a plurality of holders 215, with one holder 215 for one segmented rod 43. Each holder 215 may mate with a housing 210; and the plurality of housings 210 may mount onto a top surface of the support plate 205; which may be connect to an inside surface of the vertical segment 290 of the brace 280. Also, mounted on the top surface of the support plate 205 may be an adjustment device 250 for securing and releasing the plurality of segmented rods 43 within the holders 215.

A holder bushing 245, which mates with the adjustment device 250; may be positioned between the support plate 205 and an activation plate 225. Furthermore, a sleeve 255, which may be part of an adjustment lifting mechanism 505 (illustrated in FIG. 7), may also be positioned between the support plate 205 and the activation plate 225. A bottom end of each holder 215 may be secured to the activation plate 225 by a fastener 240. This may allow the activation plate 225 to tighten or loosen each holder 215 when the adjustment device 250 is moved. A plurality of guides 230 may connect to the support plate 205 and slide through the activation plate 225.

The support plate 205 may mount to a brace 280; which may comprise vertical segments 290 and horizontal segments 295. The brace 280 may allow for the activation plate 225 to linearly move therein when the adjustment device 250 is moved.

FIGS. 6A-6C, collectively FIG. 6, are schematics illustrating isometric, top, and sectional views of a holder assembly 200 of FIG. 5, in accordance with an embodiment of the present invention. FIG. 6A illustrates an isometric view of an assembled holder assembly 200 with a plurality of segmented rods 43, and mounted on the channel assembly 500. In an embodiment of the present invention, the holder assembly 200 may hold five segmented rods 43. This may allow for simultaneously disassembling all of the segmented rods 43 in a fuel bundle assembly 40.

In an embodiment of the present invention, the support plate 205 may be a square plate upon which components of the holder assembly 200 mount. Here, the support plate 205 may form the top of the holder assembly 200 and along with the vertical and horizontal segments 290, 295 form the shell of the holder assembly 200. The activation plate 225 may also be a square plate of a size that allows linear movement within the shell of the holder assembly 200. The activation plate 225 may serve as the means by which the plurality of holders 215 simultaneously open and close around the plurality of segmented rods 43.

In an embodiment of the present invention, the holder 215 may have the form of a tapered collet. Here, the holder 215 may slide into the housing 210, which may have the form of a hollow cylinder. A connector 220 may fasten the housing 210 to the top surface of the support plate 205, after the housing 210 has been threaded into the support plate 205. Alternatively, connector 220 may have the form a machined hex flange on a top surface of the housing 210, allowing for the housing 210 to be screwed into the support plate 205. An aft end of the holder 215 may allow for connection with the activation plate 225 via a fastener 240.

An embodiment of the adjustment device 250 may have the form of a partially threaded rod that mates with the holder bushing 245. Here, as the adjustment device 250 is rotated, the holder bushing 245 moves linearly along with the activation plate 225. The head of the adjustment device 250 may have a hex-shape, or the like, that allows for a tool to rotate the adjustment device 250. The head of the adjustment device 250 may be accessible from a top surface of the support plate 205. A head of a lifting rod 510 of the lifting mechanism 505 (illustrated in FIG. 7) may also be accessible from a top surface of the support plate 205, as illustrated in FIG. 6A.

A portion of each guide 230 may be accessible from the top surface of the support plate 205. In an embodiment of the present invention, the guide 230 may have the form of a partially threaded rod. The guide 230 may slide through the activation plate 225 and screw into the support plate 205. The guides 230 may help assemble and position the activation plate 225 with respect to the support plate 205. The guides 230 may keep the activation plate 225 in alignment with the support plate 205, to prevent binding of the activation plate 225 within the brace 280.

FIG. 6B illustrates a top view of the holder assembly 200, in accordance with an embodiment of the present invention. FIG. 6B illustrates the holder assembly 200 without segmented rods 43. FIG. 6B illustrates an embodiment of a layout that may be used to orientate some of the components of the holder assembly 200 on the support plate 205. Here, the lifting rod 510 may be centrally located on the support plate 205 within the sleeve 255; the adjustment device 250 may be located near a first corner of the support plate 205; and a guide 230 may be located in each of the remaining corners of the support plate 205.

FIG. 6C is section view along line 6C-6C of FIG. 6B. FIG. 6C illustrates how the components of the holder assembly 200 may be internally connected. For example, but not limiting of, the holder 215, in the form of a collet, is within the housing 210; which is secured to the support plate 205 via the connector 220. Alternatively, connector 220 may have the form of a machined hex flange on a top surface of the housing 210, allowing for the housing 210 to be screwed into the support plate 205. An end portion of the holder 215 is secured to the activation plate 225 via fastener 240. FIG. 6C also illustrates that the activation plate 225 resides within the boundaries of the brace 280.

The components of the holder assembly 200 may be created out of any material that can withstand the operating environment to which the segmented rod positioning chamber 1000 may be exposed. For example, but not limiting of, the holder assembly 200 may be created of materials that can withstand the environment of a nuclear spent fuel pool 12 (illustrated in FIG. 1).

Referring now to FIGS. 7A-7E, collectively FIG. 7, are schematics illustrating elevation, top, and bottom views of a channel assembly 500 of the segmented rod positioning chamber 1000, in accordance with an embodiment of the present invention. An embodiment of the channel assembly 500 of present invention may comprise: a channel 503; a lifting mechanism 505 comprising: a sleeve 255; a lifting rod 510; a plurality of windows 515; spacers 520; a positioning plate 530; a channel support plate 535; and alignment tabs 545.

The channel 503 may serve to contain the plurality of segmented rods 43 during the disassembly process. As illustrated, for example in FIG. 7A, the channel 503 may have the form of a hollow and square column. A top end of the channel 503 may be open to allow for connection with the holder assembly 200. As illustrated in FIG. 7C, a channel support plate 535 may enclose the bottom end of the channel 503. The channel support plate 535 may aide with maintaining the square shape of the channel 503. In an embodiment of the present invention, the channel support plate 535 may have a plurality of holes. These holes may reduce the weight of the channel support plate 535 and thus the overall weight of the segmented rod positioning chamber 1000; while allowing for fluids that may be present within the channel 503 to drain.

The lifting mechanism 505 may linearly move the plurality of segmented rods 43 within the segmented rod positioning chamber 1000. The lifting mechanism 505 may be located within the hollow portion of the channel 503. In an embodiment of the present invention, the lifting mechanism 505 may comprise a lifting rod 510, a plurality of spacers 520, and a positioning plate 530. The lifting rod 510 may include threaded portions. A head end of the lifting rod 510 may have a hex shape, or the like; allowing for a tool to actuate the lifting mechanism 505. A bottom end of the lifting rod 510 may be connected with the channel support plate 535.

As illustrated, for example, in FIG. 7B, the positioning plate 530 may be connected to the lifting rod 510 near an aft end, above the channel support plate 535. A portion of the positioning plate 530 may comprise a means to mate with the lifting rod 510. Here, as the lifting rod 510 rotates, the positioning plate 530 moves linearly, as described. In an embodiment of the present invention, the positioning plate 530 may comprise a series of threads that mate with the screw portions of the lifting rod 510. This may allow the positioning plate 530 to move linearly, while the lifting rod 510 is rotated.

As illustrated in FIG. 7, spacers 520 are located throughout the channel 503. The spacers 520 may serve to prevent each segmented rod 43 from bowing while inside the channel assembly 500. FIG. 7E illustrates a spacer 520 of an embodiment of the present invention. The spacer 520 may have the form of the square plate with multiples holes, wherein each hole may allow for a segmented rod 43 to slide through. The spacer 520 may also have a center opening for allowing the lifting rod 510 to slide through. FIGS. 7B and 7D illustrate an example of how each spacers 520 may be positioned on the lifting rod 510. The spacers 520 may be equally positioned along the lifting rod 510, wherein each spacer 520 is located above the positioning plate 530.

In an embodiment of the present invention, a series of keys 540 may be located around the periphery of each spacer 520. The keys 540 may have the form of a notch, or the like. Each key 540 may mate with an alignment tab 545, which may be located within the channel 503. The plurality of keys 540 and alignment tabs 545 may form a system that limits the movement of each spacer 520 located within the channel 503. This may provide an effective way of ensuring that each spacer 520 consistently returns to a designated position of being moved by the positioning plate 530. Here, the location of each key 540 and corresponding alignment tab 545 may be unique to each spacer 520 located within the channel 503. This system may allow for each spacer 520 to return to a designated positioned when the lifting rod 510 lowers or raises the positioning plate 530. This system may also allow for the spacers 520 to directly or indirectly collapse upon the positioning plate 530 when being raised by the lifting rod 510.

The channel 503 may also comprises windows 515 along at least one side, as illustrated in FIGS. 7A to 7D. The windows 515 may allow for fluid of the spent fuel pool 12 (illustrated in FIG. 1) to flow through the segmented rod positioning chamber 1000. The windows 515 may also lighten the overall weight of the channel assembly 500. The windows 515 may also reduce the chance of debris becoming lodged within the segmented rod positioning chamber 1000 and a visual aid during the operation of the segmented rod positioning chamber 1000.

The channel 503 of the channel assembly 500 may be created out of a transparent material allowing for viewing the plurality of segmented rods 43 within the channel assembly 500. The remaining components of the channel assembly 500 may be created out of any material that can withstand the operating environment to which the segmented rod positioning chamber 1000 may be exposed. For example, but not limiting of, the holder assembly 200 may be created of materials that can withstand the environment of a nuclear spent fuel pool 12.

Figure 8A:
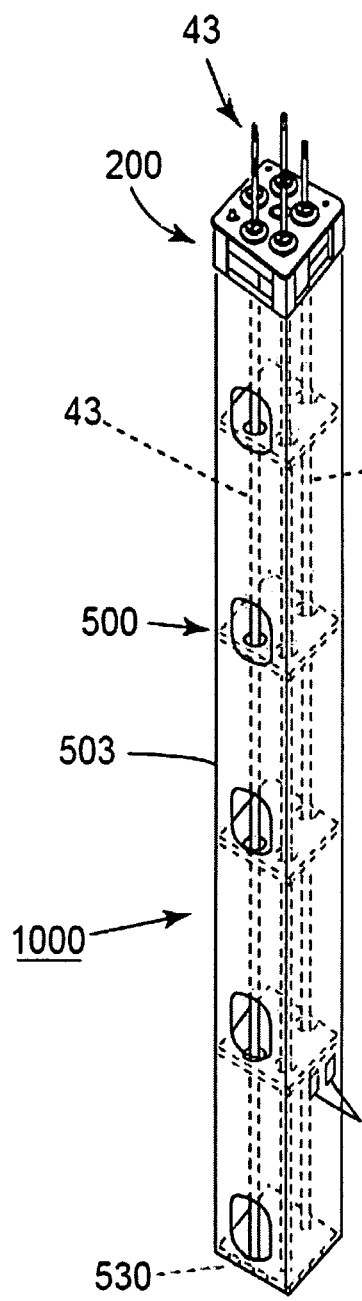
FIGS. 8A-8C, collectively
Figure 8B:
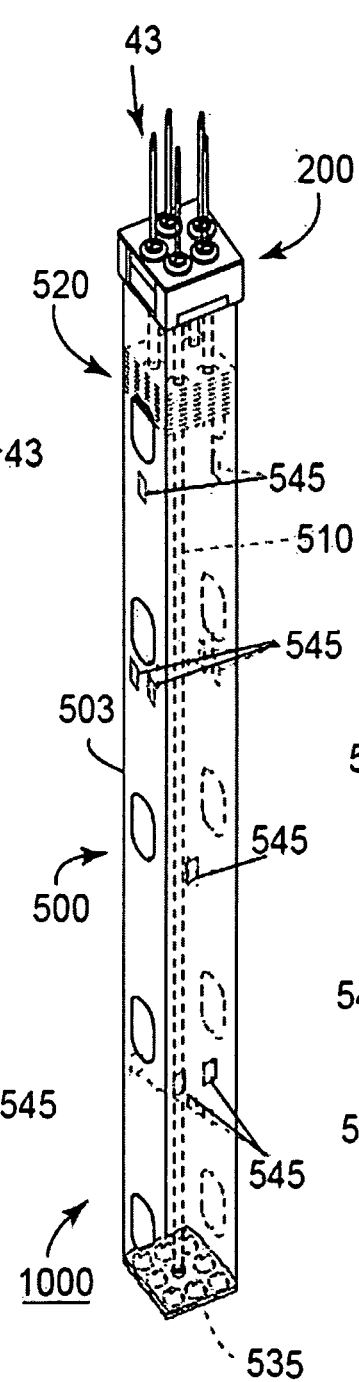
Figure 8C:
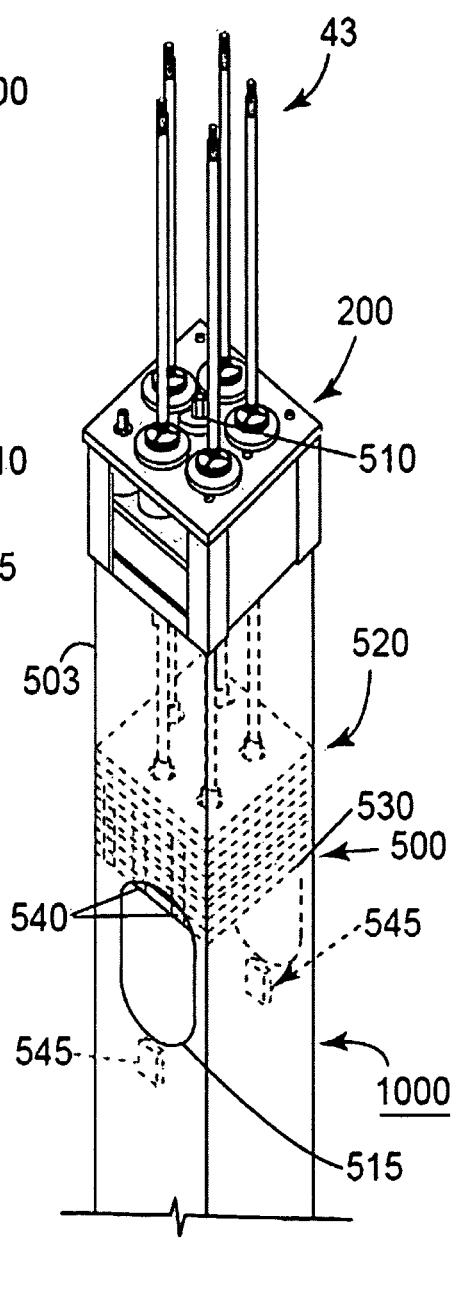

FIGS. 8A-8C, collectively FIG. 8, are schematics, illustrating isometric views of the segmented rod positioning chamber 1000 in use, in accordance with an embodiment of the present invention. As discussed, an embodiment of the present invention allows an operator to quickly arrange a plurality of segmented rods 43 for disassembly. In an embodiment of the present invention, the holder assembly 200 may use collets to maneuver several segmented rods 43, as illustrated in FIG. 8.

FIG. 8A illustrated the engagement of the keys 540 with the alignment tab 545, while the positioning plate 530 is located near the bottom of the channel 503. Here, the length of each segmented rod 43 may be the original length before disassembly has started. FIGS. 8B and 8C illustrate the segmented rod positioning chamber 1000 having the spacers 520 collapsed upon the positioning plate 530. Here, an operator, as described, has removed the majority of segments.

In an embodiment of the present invention, an operator may use a tool to actuate the lifting rod 510 to raise the positioning plate 530 to a level where a first segment may be removed from the segmented rod 43. The operator may then actuate the adjustment device 250 of the holder assembly 200, to tighten and/or loosen the holders 215 around the segmented rods 43. Here, an operator may use a tool to remove the first segments from the segmented rods 43. Next, the operator may repeat the aforementioned process until all segments of the segmented rods 43 are removed. If additional segmented rods 43 need to be disassembled, an operator may actuate the adjustment device 250 to loosen the holders 215 and actuates the lifting rod 510 to lower the positioning plate 530. Here, additional full length segmented rods 43 may be inserted into segmented rod positioning chamber 1000 and the aforementioned process may be repeated.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for positioning a plurality of segmented rods, each segmented rod configured to be used in a nuclear fuel bundle, each segmented rod formed by a plurality of removable segments secured to each other, the system comprising:
 a channel assembly configured to receive the plurality of segmented rods, wherein the channel assembly is configured to enclose the plurality of segmented rods and includes,
  a channel having windows along a perimeter of the channel, wherein the windows allow for access to an internal area of the channel assembly, and wherein the channel includes alignment tabs,
  spacers located within the channel, wherein each spacer includes at least one key around a periphery, wherein the alignment tabs are configured to restrict linear movement of each spacer, and wherein each of the alignment tabs mates with one of the keys and is located at an elevation allowing for the one spacer to maintain a designated position;
 a lifting mechanism inside of and moveable within the channel, wherein the lifting mechanism is configured to simultaneously move only the plurality of segmented rods to a position outside the channel to allow for assembly or disassembly of each of the plurality of segmented rods by joining or removing the removable segments in or from each segmented rod, wherein the lifting mechanism is configured to move the plurality of segmented rods in unison, and wherein the lifting mechanism includes,
  a positioning plate entirely within the channel, wherein the spacers are located above the positioning plate, and wherein the positioning plate is configured to move the plurality of segmented rods and is slidably movable within the channel by the lifting mechanism, and
  a lifting rod, wherein a portion of the lifting rod mates with the positioning plate, and wherein the positioning plate is configured to move in a linear direction as the lifting rod is rotated; and
 a holder assembly located at a top end of the channel assembly, wherein the holder assembly includes,
  a holder for each segmented rod, wherein the holder is configured to secure the plurality of segmented rods in a position allowing for assembly or disassembly of each of the plurality of segmented rods,
  a mechanism configured to open and close each holder, wherein the mechanism is configured to open and close all holders in unison, and
  an opening that allows for integrating the lifting mechanism with the holder assembly.

2. The system of claim 1, further comprising:
 a basin configured to hold components of the segmented rods, wherein the holder assembly is located within the basin.

3. The system of claim 1, wherein the basin is created of a transparent material allowing for viewing the holder assembly.

4. The system of claim 1, wherein the channel is created of a transparent material allowing for viewing the plurality of segmented rods within the channel assembly.

5. The system of claim 1, wherein each spacer defines a hole for each segmented rod to slide through.

6. The system of claim 1, wherein,
each holder of the holder assembly slides into a housing,
a first end of the housing is mounted onto a support plate which forms a top surface of the holder assembly,
each housing and each holder slide through an activation plate, and
an aft end of each holder is secured to the an aft end of the activation plate.

7. The system of claim 6, wherein,
the mechanism for opening and closing the holder includes an adjustment device which slides through an opening on the support plate and is secured to the activation plate,
if the adjustment device is adjusted in a first direction, the activation plate is configured to move to free each segmented rod within each holder, and
if the adjustment device is adjusted in a second direction, the activation plate is configured to move to secure each segmented rod within each holder.

8. The system of claim 7, wherein each holder includes a tapered collet.

9. The system of claim 8, wherein the holder assembly includes guides for connecting the support plate to the activation plate.

10. The system of claim 9, wherein the support plate fits over the channel assembly and the activation plate slides within the channel assembly.

11. The system of claim 9, wherein,
the holder assembly includes a brace upon which the support plate is mounted,
the brace includes vertical segments connect to horizontal segments, and
the brace fits around the channel assembly.

12. A system for positioning a plurality of segmented rods, each segmented rod configured to be used in a nuclear fuel bundle, each segmented rod formed by a plurality of removable segments secured to each other, the system comprising:
a channel assembly configured to receive and enclose the plurality of segmented rods, wherein the channel assembly includes,
a channel including an alignment tab at an elevation in the channel,
a lifting mechanism including a positioning plate inside of and moveable within the channel, wherein the lifting mechanism is configured to simultaneously move the plurality of segmented rods to a position outside the channel to allow for assembly or disassembly of each of the plurality of segmented rods by joining or removing the removable segments in or from each segmented rod, and
a spacer inside of the channel above the positioning plate, wherein the spacer includes a key around a periphery configured to mate the spacer with the channel via the alignment tab to maintain the spacer at the elevation.

* * * * *